United States Patent
Michael

(10) Patent No.: US 6,735,343 B2
(45) Date of Patent: May 11, 2004

(54) POLYGON FINDER AND PRUNED TREE GEOMETRIC MATCH METHOD

(75) Inventor: Nevine Michael, Saline, MI (US)

(73) Assignee: Electro Scientific Industries Inc., Portland, OR (US)

( * ) Notice: Subject to any disclaimer, the term of this patent is extended or adjusted under 35 U.S.C. 154(b) by 177 days.

(21) Appl. No.: 09/903,265

(22) Filed: Jul. 11, 2001

(65) Prior Publication Data

US 2002/0037105 A1 Mar. 28, 2002

Related U.S. Application Data

(60) Provisional application No. 60/223,504, filed on Aug. 7, 2000.

(51) Int. Cl.$^7$ .............................................. G06K 9/48
(52) U.S. Cl. ........................................ 382/241; 345/420
(58) Field of Search ................................ 382/195, 192, 382/241, 194, 198, 199, 201, 219, 178, 155, 190, 209, 203, 220, 154, 217; 345/422, 592, 629, 624, 420, 423, 442, 441, 419; 362/84; 434/43

(56) References Cited

U.S. PATENT DOCUMENTS

| | | | | |
|---|---|---|---|---|
| 5,338,200 A | * | 8/1994 | Olive | 434/43 |
| 5,363,475 A | * | 11/1994 | Baker et al. | 345/422 |
| 5,500,906 A | * | 3/1996 | Picard et al. | 382/220 |
| 5,831,628 A | * | 11/1998 | Shimizu | 345/629 |
| 5,967,638 A | * | 10/1999 | Gorman et al. | 362/84 |
| 6,128,405 A | * | 10/2000 | Fujii | 382/154 |

OTHER PUBLICATIONS

John W. Gorman, Recognition of Incomplete Polygonal Objects, 1989, Univ., Columbia, sc, coll. of Eng, pp. 518–522.*

Nov. 10, 2002 International Search Report PCT.

Mar. 26, 1989: Gorman, John W.: "Recognition of Incomplete Polygonal Objects" Proceedings, Twenty First Southeastern Symposium on Tallahassee, Fl, USA pp. 518–522, the entire document.

Oct. 1, 1991: Flynn, Patrick J.: "Bonsai: 3–D Object Recognition Using Constrained Search" IEEE Inc. New York, U.S. pp. 1066–11075, the entire document.

Jun. 18–22, 1989: Li, Wei et al.: "Object Recognition Based on Graph Matching Implemented by a Hopfield–Style Neural Network" International Joint Conference on Neural Networks, Washington D.C. pp. 287–290, the entire document.

Jul. 4, 1986: Burns, J. Brian: "Extracting Straight Lines" IEEE Transactions on Pattern Analysis and Machine Intelligence, IEEE, New York, US, the entire document.

* cited by examiner

*Primary Examiner*—Jayanti K. Patel
*Assistant Examiner*—Seyed Azarian
(74) *Attorney, Agent, or Firm*—Young & Basile, PC

(57) ABSTRACT

A polygon finder and pruned tree search are provided. The polygon finder uses a geometric matcher to compare corner features from a polygon model against extracted corner features from an input image to locate an object in the image that matches the polygon. Any geometric match technique may be used to locate the polygons based on their corner features. The preferred geometric matcher is a pruned tree search which calculates pose and match fit errors during search tree construction. If the pose falls outside predefined pose bounds or the fit errors are larger than the maximum limit imposed by features uncertainty bounds, the search branch is truncated. The preferred geometric matcher may be used to locate any type of geometry.

35 Claims, 12 Drawing Sheets

FIG - 4

DIFFERENTIATE
One dimensional kernels of varying sizes. Suitable for small features.

Size 1:   Kx  | -1 | 1 |     Ky | -1 |
                                 |  1 |

Size 2:   Kx  | -1 |   | 1 |   Ky | -1 |
                                   |    |
                                   |  1 |

DIFFERENTIATE_2D
Two dimensional kernels

Kx  | -1 | 1 |     Ky | -1 | -1 |
    | -1 | 1 |        |  1 |  1 |

ROBERTS
Suitable for diagonal features.

Kx  | -1 |    |     Ky |    | 1 |
    |    | 1  |        | -1 |   |

PREWITT
Has a smoothing effect due to its larger 3x3 kernels

Kx  | -1 |   | 1 |     Ky | -1 | -1 | -1 |
    | -1 |   | 1 |        |    |    |    |
    | -1 |   | 1 |        |  1 |  1 |  1 |

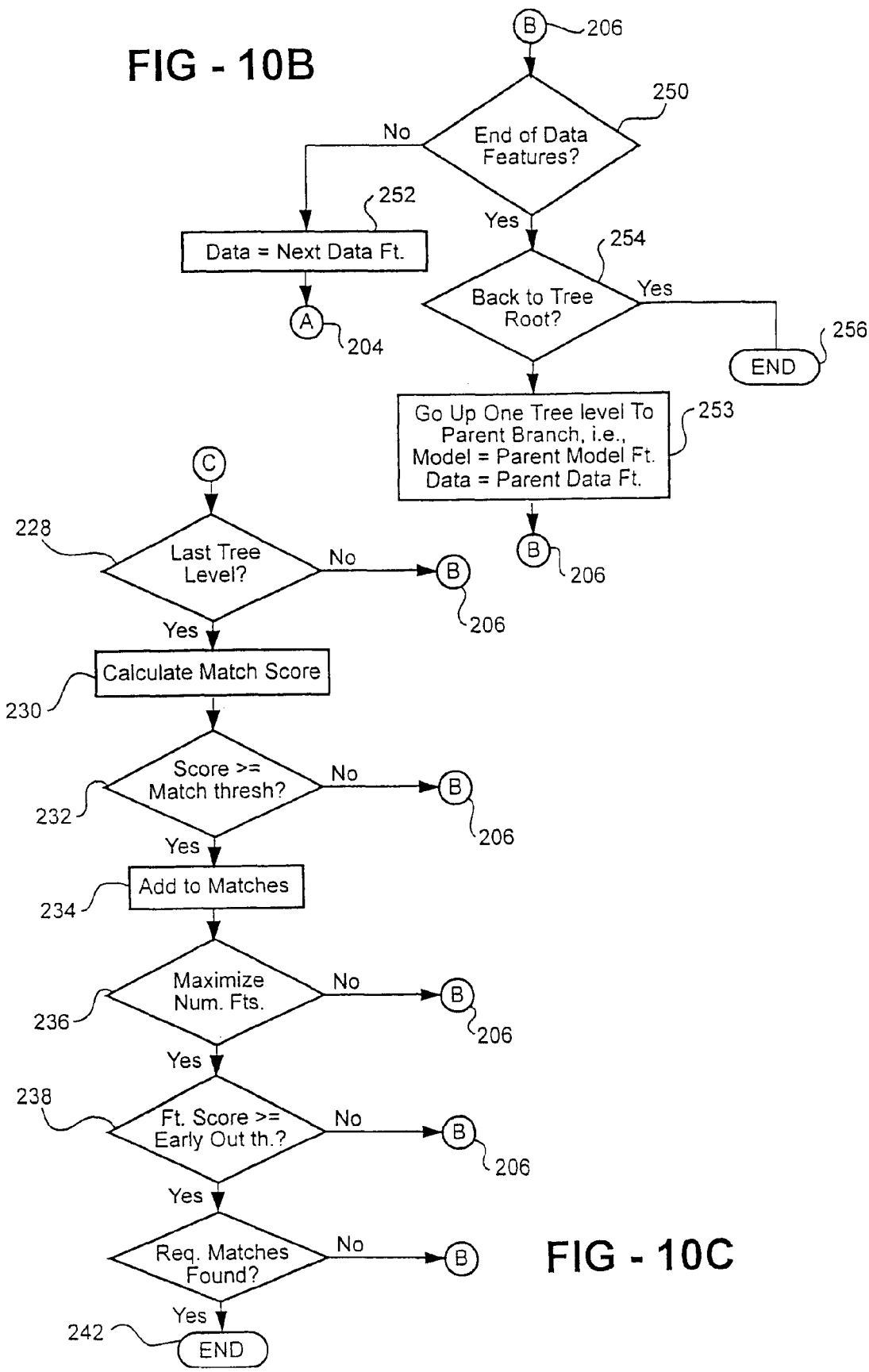

POLYGON FINDER AND PRUNED TREE GEOMETRIC MATCH METHOD

This application claims the benefit of the priority date of co-pending Provisional Application Ser. No. 60/223,504, filed Aug. 7, 2000 in the name of Nevine Michael, the entire contents of which are incorporated herein by reference.

FIELD OF THE INVENTION

The present invention includes two distinct aspects which are preferably used together. The first aspect relates to a method to find polygons which uses data from the corners of polygons. The second aspect relates to search tree for a geometric match wherein search tree segments are truncated or pruned. The preferred embodiment of the invention relates to locating polygons based on corner data using the inventive geometric matching technique.

BACKGROUND OF THE INVENTION

The manufacture of integrated circuit chips rely on high speed manufacturing processes which typically incorporate systems which inspect the chips or provide a reference location on the chips. Such systems include cameras which capture images of the chips and controllers or computers which are operative to locate objects within the images. Objects are located or inspected to either approve the quality and configuration of a part or direct some aspect of the manufacturing process.

Many different techniques have been developed to locate objects within images. Many popular techniques involve correlation. There are several types of correlation methods including convolution, normalized correlation, least mean squares error and least mean absolute error. Correlation requires the definition of a template or kernel which is a separate small image with the same shape as the object to be located. Like the object, the template may be represented by spatial coordinate points with a brightness for each value. These spatial points are commonly referred to as pixels. The template is moved across the image and correlated against the image to determine a match. Correlation techniques are often used because they can locate an object within an image in a comparatively short period of time. One of the fastest and most accurate correlation techniques in the marketplace is binary vector correlation. The theory behind binary vector correlation is covered in a paper entitled "Vector Morphology and Iconic Neural Networks" by S. S. Wilson in *IEEE Transactions on Systems Man, and Cybernetics*, November/December, 1989 Vol. 19, nol 6, pp. 1636–1644. Correlation techniques have improved as disclosed in commonly assigned U.S. Pat. No. 6,023,530.

While correlation techniques are comparatively fast, one problem with many correlation techniques is that they are rotationally and scale intolerant. Rotational intolerance describes the situation where the relative angle of the object within the image, as measured from a Cartesian axis, is different from the angle of the template as measured from the same Cartesian axis. An example of this would be a square and a diamond with equal length sides and corner angles of ninety degrees. Scale intolerance problems created when the template is a different size compared to the object. Thus, correlation techniques are not particularly useful in finding rotated objects.

An example of where correlation techniques have been successfully used is in the semiconductor industry to locate pads on integrated circuit chips. Pads provide the interconnection interface to device or other circuitry and need to be accurately located before probing and bonding. In the past, the pad was square or rectangular in shape. However, as chip design has advanced pad shapes have changed and have rotated. Thus, prior art correlation techniques are not particularly well suited to certain advancements in the manufacturing of integrated circuit chips.

Also in pick and place operations, chip components are picked from a tray, inspected and then placed to be soldered on a printed circuit board. The picked component may be rotated or offset from an expected position and it is necessary to use a vision system to find its orientation, the correct size and potentially inspect it in order for it to be placed correctly on the board. In another aspect of this process, a vision system may be used to locate fiducials or registration marks on the circuit boards in order to find the location and orientation of the board before chip components are placed.

An image processing techniques which has been used to locate rotated objects is geometric matching. Geometric matching describes the process of comparing individual geometric features from a model against geometric features extracted from an image to locate an object within the image. For example, the geometric features from a model may be the length, location and direction of a pattern of line segments. A geometric matching technique would extract line segments from an input image and compare each extracted line segment against the collection of predefined geometric features to locate an object within an image.

Many types of geometric matches are available in the prior art. These include key feature algorithms; generalized Hough algorithms; search trees and geometric hashing. Key feature algorithms search for a small number of highly distinctive local geometric features which indicate the placement of an object in an image. Generalized Hough algorithms employ voting schemes to search all possibilities in a pose space. Tree search algorithms expand a tree of potential matches between a model and image features using local geometric consistencies constraints for pruning. Geometric hashing first creates a hash table of all subsets of image features and then at run time selects sets of data features within an acquired image and looks up their correspondence in the hash table. These prior art techniques are described in an article entitled "*Local Search Algorithms for Geometric Object Recognition: Optimal Correspondence and Pose*, J. Ross Beveridge, University of Massachusetts at Amherst, Ph.D. Dissertation, June 1993, (Also *UM Mass Techreport* 93–71), which is incorporated herein by reference.

Of the many prior art techniques, tree searches examine the most features and is thus the most computationally intensive. Because of the enormous amount of data which may be compared the search tree and other geometric matching techniques are often slow.

Because of its comparatively slower speed to provide high accuracy, geometric matches are not always well suited to the requirements of the integrated circuit chips industry. Therefore a need has arisen to provide a method to quickly locate an object within an image where the object is rotated.

SUMMARY OF THE INVENTION

The first aspect of the present invention provides for a method for locating a polygon within an image using a polygon model defined by corner features. An image is captured and corner features are extracted from the image. A geometric match is used to compare the corner features from the polygon model against the corner features extracted from the image to locate a polygon within the image that matches the polygon model.

In a preferred embodiment of the first aspect of the present invention, line edge segments are extracted from the input image and it is determined whether the line edge segments define corners. Corners are formed from the line edge segments where the line segments define corners.

A further aspect of the preferred embodiment of the first aspect of the present invention locates polygons using a search tree including comparing the corner features from the model against the plurality of corners features extracted from the image, calculating a pose and calculating fit errors and match score for each of the comparisons, and; truncating the search tree if the pose fit errors and match score fall outside predefined parameters.

The first aspect of the present invention also provides for an article of manufacture including a computer readable medium bearing computer program code embodied therein for performing a task. The computer readable medium includes means for defining a polygon model defined by corner features, means for activating a camera to capture an image of an object wherein the image includes a polygon, means for extracting corner features from the image, and means for geometrically matching the corner features from the polygon model against the corner features extracted from the image to locate a polygon within the image that matches the polygon model.

A second aspect of the present invention provides for a pruned tree search including providing a model of the object including a plurality of geometric model features and an input image. A plurality of geometric features are extracted from the input image where the geometric features are of the same quality of the geometric model features. A first geometric model feature is compared against the plurality of extracted geometric features and the first geometric model feature is matched against a first extracted geometric feature if their comparison falls within predefined local consistency measures to thereby form a first branch within the search tree. A second geometric model feature is compared against the plurality of extracted geometric features and the second geometric model feature is matched against a second extracted feature if their comparison falls within predefined local consistency measures to thereby form a second branch within the search tree which depends from the first branch. A third geometric model feature is matched against the plurality of extracted geometric features and a provisional match is found between the third geometric model feature and a third extracted geometric feature. A pose is calculated based on the comparison of the first through third model features and extracted features, and the provisional match is not accepted if the pose falls outside a predefined pose bound.

A preferred embodiment of the second aspect of the present invention involves transforming the model features based on the calculated pose and calculating fit errors based on the difference between the pose-transformed model and the matched features location. The provisional match is not accepted if the fit errors fall outside the maximum defined fit errors.

A further preferred embodiment of the present invention allows the geometric match to minimize fit error or maximize the number of matches. If the fit error is minimized the search tree is constructed with a minimum number of matched features wherein the minimum number of matched features is less than the plurality of geometric features. If the match is set to maximize the number of matched features the search tree is constructed such that a required number of matches is that all of the geometric features are matched against extracted geometric features.

The second aspect of the present invention also provides a computer readable storage medium containing software executable by a computer to perform process steps for performing a geometric match to locate an object within a captured image utilizing a model of the object, wherein the model includes a plurality geometric features. The process steps include extracting a plurality of geometric features from the input image of the same quality of the geometric model features. A first geometric model feature is compared against the plurality of extracted geometric features and the first geometric model feature is matched against a first extracted geometric feature if their comparison falls within predefined local consistency measures to thereby form a first branch within the search tree. A second geometric model feature is compared against the plurality of extracted geometric features and the second geometric model feature is matched against a second extracted feature if their comparison falls within predefined local consistency measures to thereby form a second branch within the search tree which depends from the first branch. A third geometric model feature is matched against the plurality of extracted geometric features and a provisional match is found between the third geometric model feature and a third extracted geometric feature. A pose is calculated based on the comparison of the first through third model features and extracted features, and the provisional match is not accepted if the pose falls outside a predefined pose bound.

The computer readable storage medium may also be configured to carry out the process steps of transforming the model features based on the calculated pose, match score and calculating fit errors based on the difference between the pose-transformed model and the matched features location. The provisional match is not accepted if the fit errors fall outside the maximum defined fit errors.

In the preferred embodiment the first and second aspects of the present invention are used together. In particular, the preferred method of locating a polygon in an image including providing a polygon model including a plurality of model features where each model feature characteristic of a corner from the polygon. An input image is also provided and a plurality of corner features are extracted from the input image. A first model feature is compared against the plurality of extracted corner features and the first model feature is matched against a first extracted corner feature if their comparison falls within predefined local consistency measures to thereby form a first branch within a search tree. A second model feature is compared against the plurality of extracted corner features an the second model feature is matched against a second extracted corner feature if their comparison falls within predefined local consistency measures to thereby form a second branch within the search tree which depends from the first branch. A third geometric model feature is compared against the plurality of extracted corner features and a provisional match is found between the third geometric model feature and a third extracted corner feature. A pose is calculated based on the comparison of the first through third model features and extracted corner features but the provisional match is not accepted if the pose falls outside a predefined pose bound.

The preferred embodiment of the first and second aspect of the present invention involves transforming the model features based on the calculated pose and calculating fit errors based on the difference between the pose-transformed model and the matched features location. The provisional match is not accepted if the fit errors fall outside the maximum defined fit errors.

BRIEF DESCRIPTION OF THE DRAWINGS

FIG. 4 is an illustration of various edge detection operators.

FIG. 10B is a continuation of FIG. 10A.

FIG. 10C is a continuation of FIG. 10A.

DESCRIPTION OF THE PREFERRED EMBODIMENTS

With reference to the drawings wherein in like elements are numbered alike the polygon finder and the pruned tree search techniques of the present inventions are shown.

In the first aspect of the present invention, polygons are input into the system based on corner features. These polygons may be manually input into the system, or may be trained from reference images or objects. The corner features from the input polygons are then input into a geometric matcher along with corner information extracted from an input image to locate the polygon.

The polygon finder can be used to locate regular and irregular polygons in an image. Preferably, the method of the polygon finder determines the location of a polygon defined by an x, y coordinate position, an angle of rotation and change in the x, y scales of all possible matches in a search window. It is understood that in this aspect of the invention any geometric match technique can be used. Generally, a geometric matching technique is useful in locating a pattern in an image using its geometric features. Geometric matching techniques are particularly useful when the pattern is rotated, scaled and/or shifted. A geometric matcher can also be used when part of the pattern is missing and when features extracted from an input image include extraneous data. Such techniques include but are not limited to search trees; key features algorithms; generalized HOUGH algorithms; and; geometric hashing.

Figure 1:
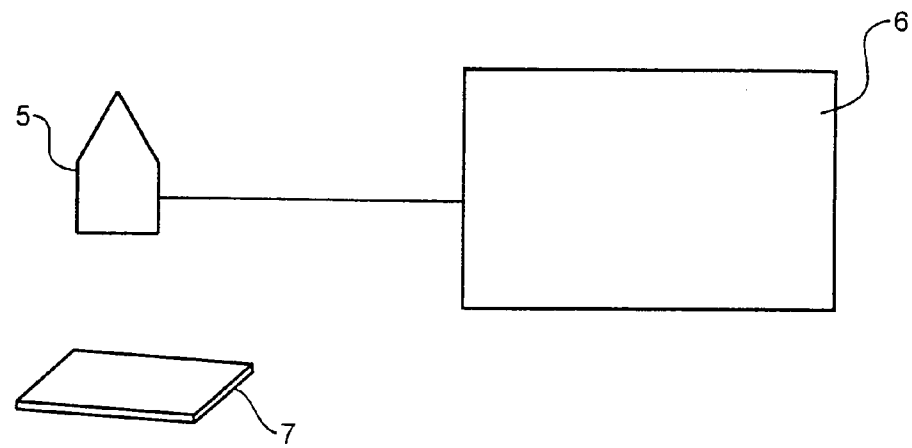
FIG. 1 is a block diagram of the image processor of the present invention.

FIG. 1 generally illustrates a vision system 4 including a camera 5, a controller or processor 6 including a memory vision system 4 is operator to inspect chip 7 or to locate a feature on chip 7 a semiconductor or chip 7. Camera 5 captures an image 10 of an integrated circuit chip 7 which is sent to processor 6. Processor 6 is configured to locate objects within image 10 or inspect image 10.

Figure 2A:
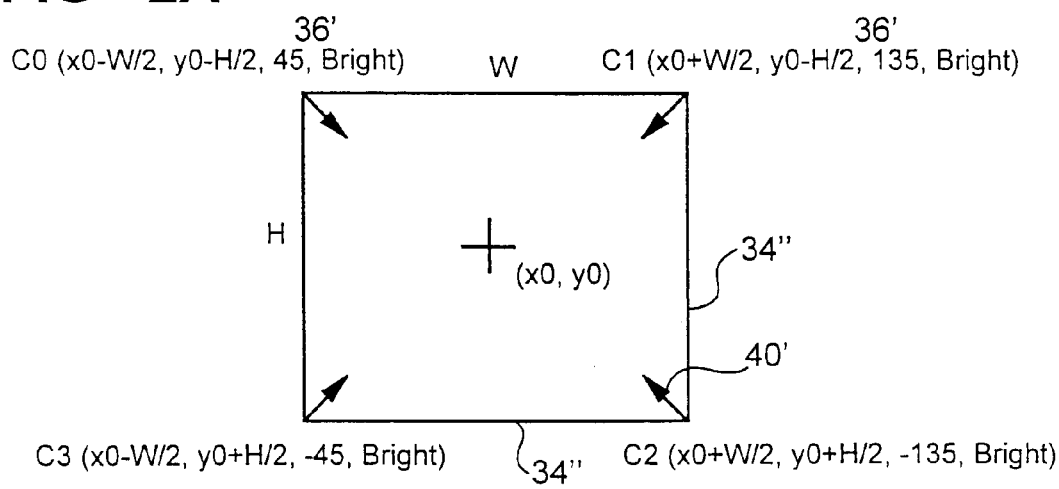
FIGS. 2A, 2B and 2C are polygon models including model features.
Figure 2B:
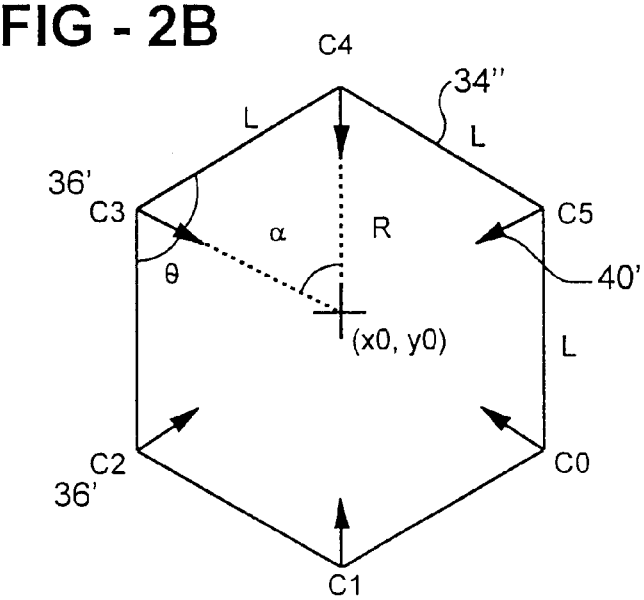
Figure 2C:
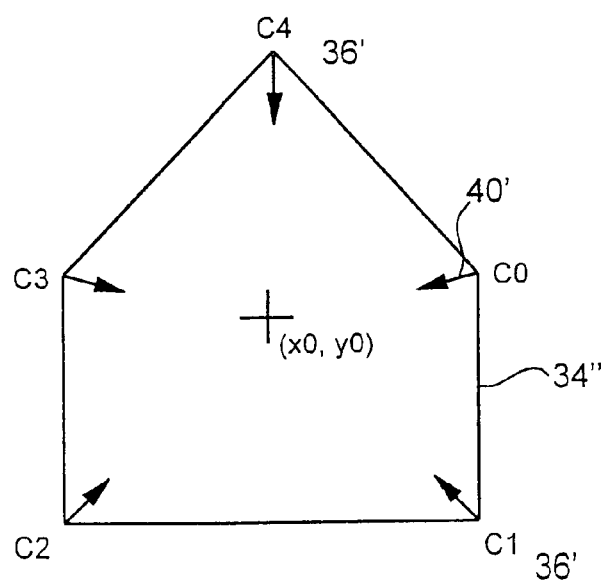

With reference to FIGS. 2A, 2B and 2C there are shown a variety of predefined polygons which are input into the system in a training phase. The training phase describes the time in which the appropriate parameters for matching are set up. Typical set up parameters include expected location; size tolerance; polygon polarity, and; polygon model type. Expected location describes the position of the polygon center in X and Y coordinate positions and is used as the reference point for the pattern during geometric matching. Corners of the polygon may also include a location relative to the polygon center. Size tolerance is preferably a user defined parameter which establishes scale bounds for geometric matching. Polygon polarity may either be a bright polygon on a dark background or a dark polygon on a light background. This also defines the polarity of each corner in the polygon as being either a light corner or a dark corner. The polygon polarity defines the polarity of the corners which will be extracted from an input image. In the preferred embodiment and as illustrated, the polygon model may be defined one of three ways, namely Rectangles, Regular polygons and General polygons. Each polygon model is made up of line edge segments 34", and includes corners 36' with corner directions 40'.

As shown in FIG. 2A Rectangles are defined as having an expected width (W) and height (H). Relative corner positions are then calculated as indicated. Regular polygons are shown in FIG. 2B and include a number of sides (N) and a side length (L). Other features of a regular polygon are calculated as shown below:

Angle $\alpha=360/N$

Vertex angle: $\theta-180-\alpha$

Radius: $R=0.5*L/\sin(\alpha/2)$

For vertex $i$: $x_i=R*\cos((i+0.5)*\alpha)$ $i=0,\ldots,N-1$ $y_i=R*\sin((i+0.5)*\alpha)$ $\phi=(I+0.5)*\alpha-180$ A general polygon is illustrated in FIG. 2C and is preferably defined by the position of the polygon corners 36', relative to the polygon center. The corners are preferably arranged in a clockwise or counter clockwise direction. For each corner number the angle formed by a line joining one corner to the next is calculated. The direction of the corner is equal to the angle that the corner angle bisector makes with the X-axis.

Figure 7:
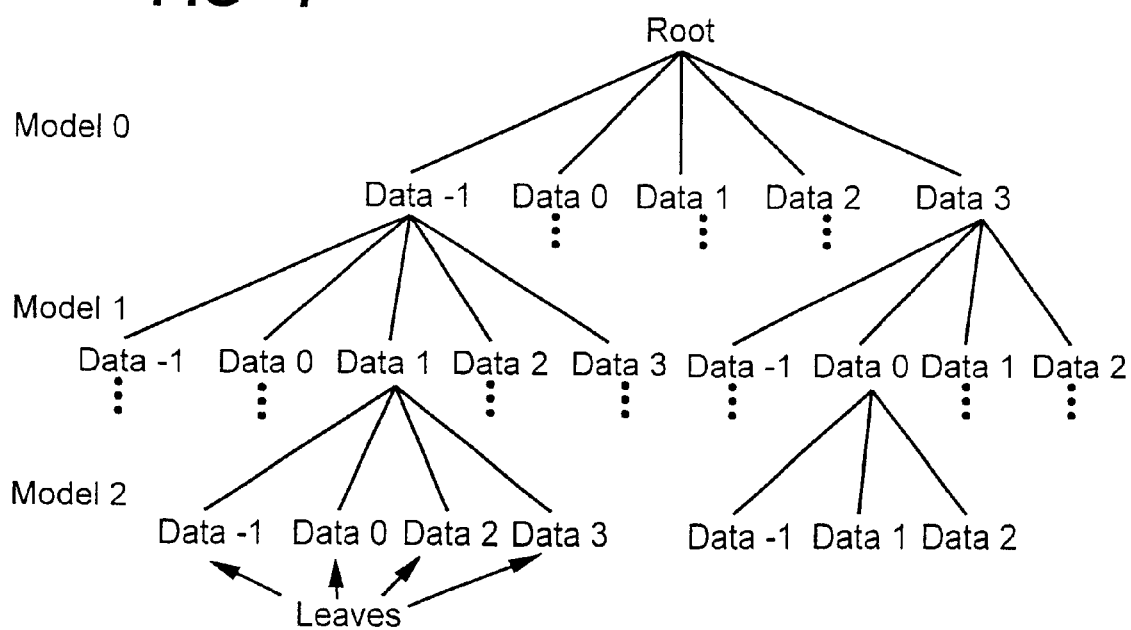
FIG. 7 generally illustrates the concept of search trees.
Figure 3:
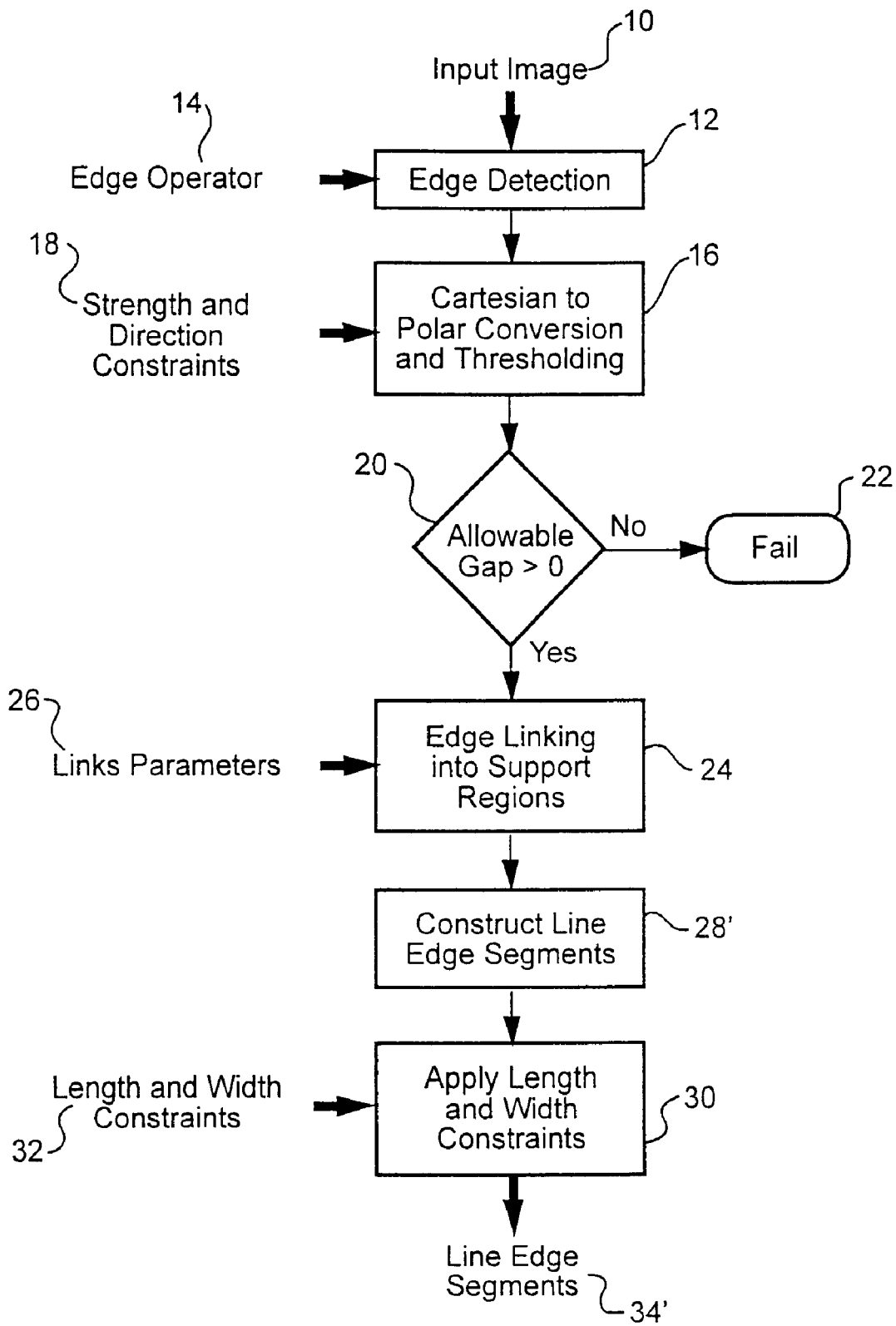
FIG. 3 is a flow chart of the detection of line edge segments.
Figure 5A:
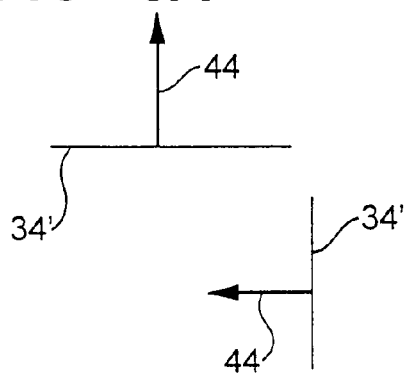
FIG. 5A is an illustration of a defined corner within a polygon.
Figure 5B:
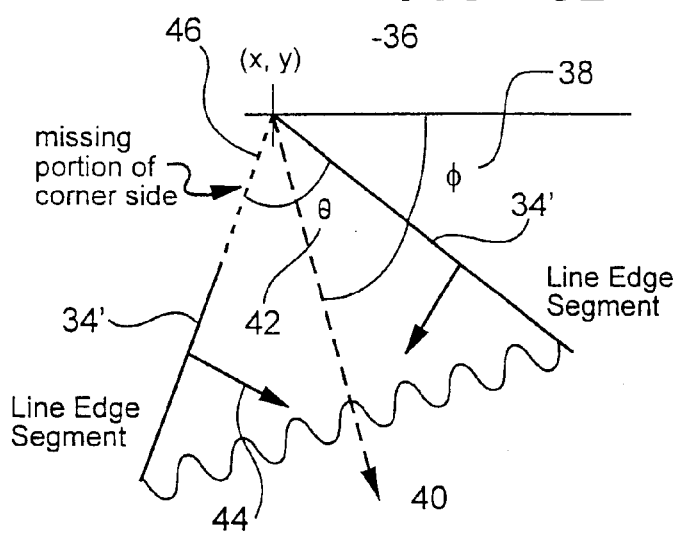
FIG. 5B is an illustration of two line segments which do not form a corner.
Figure 5C:
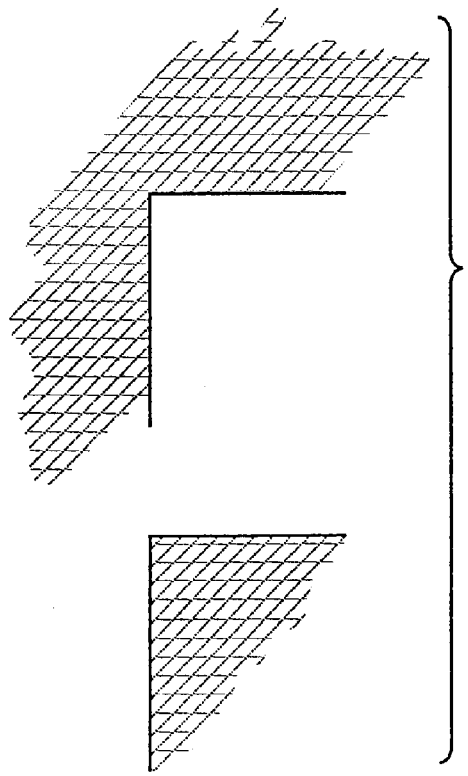
FIG. 5C is an illustration of a dark corner and a light corner.
Figure 6:
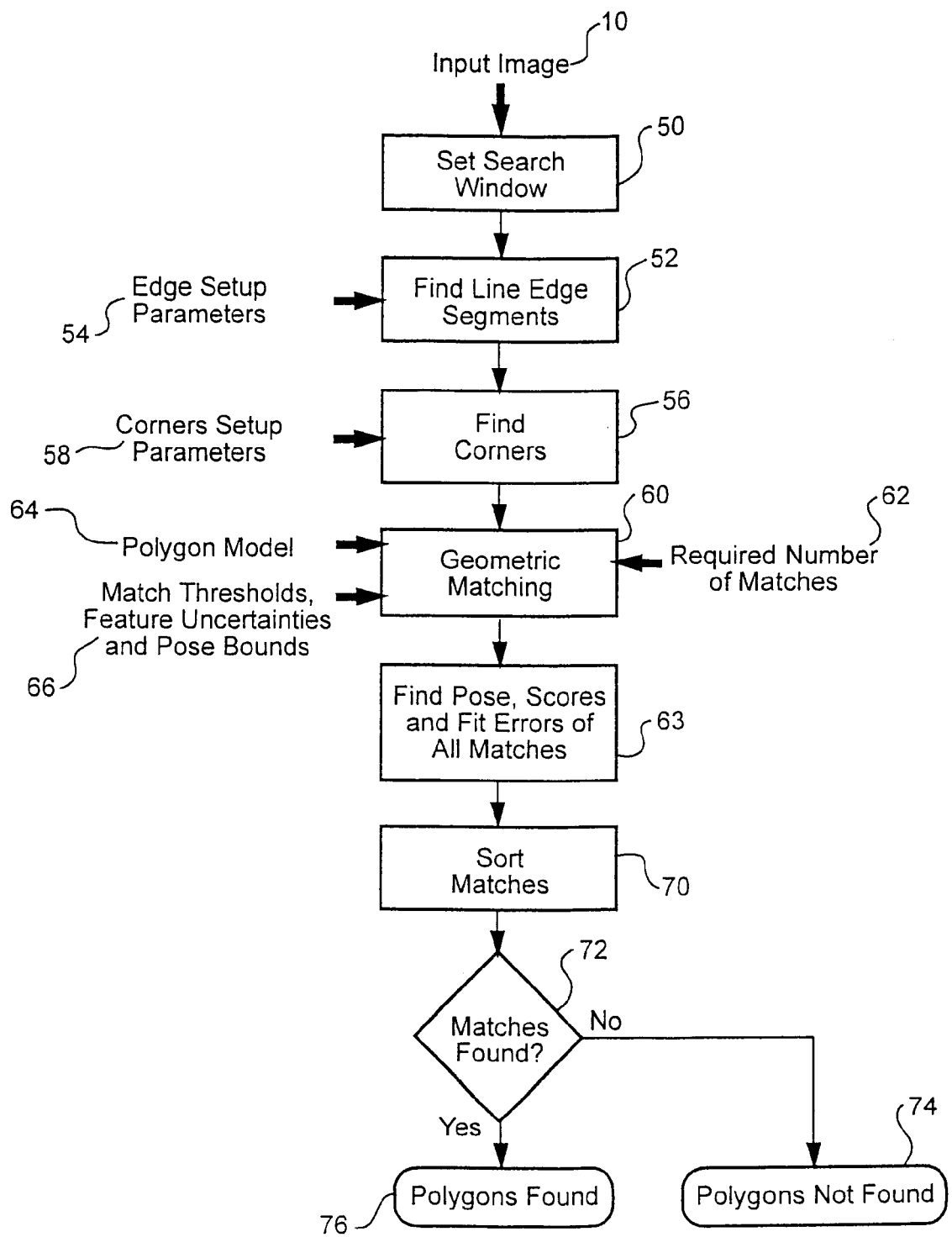
FIG. 6 is a flow chart of the general polygon finder.

With reference to FIGS. 3–6 there are shown flow charts for the polygon finder according to the first aspect of the present invention. FIG. 6 illustrates a general flow chart for the polygon finder while FIGS. 3–5 are more detailed flow charts for different underlying operations. Initially, an image 10 from an object is captured and input into the system. As shown in FIG. 7, the user preferably sets a search window at 50. Search window 50 typically represents an area in which a user expects the polygon to be found. After the search window has been set, the system finds line edge segments at 52 using edge set-up parameters 54.

Finding edges and line edge segments are best illustrated in FIGS. 3–4. As background, input images are typically made up of pixels having gray scale values between 0 and 255. Edge support regions are defined as a group of edge pixels which form an edge region. An edge pixel is defined as a shift in brightness values from light to dark. This concept can be seen in any of FIGS. 2A through 2C. Edge pixels are linked into an edge support region if the magnitude and direction of neighboring pixels lie within specified tolerances. Line edge segments are straight line segments that are obtained from edge support regions using any of a number of known techniques. One such technique may be found at J. B. Burns, A. R. Hanson, E. M. Riseman, "Extracting Straight Lines", IEEE Pattern Analysis and Machine Intelligence, Volume PAMI-8, #4, July 1986, which is incorporated herein by reference.

With reference to FIG. 3, there is shown a flow chart for finding line edge segments. As shown in the figure a number of input parameters are provided, e.g. edge operator 14, strength and direction constraints 18, link parameters 26 and length and width constrains 32.

Many possible edge operators 14 are available. The edge operator defines the kernels used in the edge detection. Four different edge operators are illustrated in FIG. 4. The preferred operator is the PREWITT edge operator because it looks at a neighborhood of 9 neighboring pixels to determine an edge.

The input image is convolved with the edge operator kernels to form the two images; xImg and yImg which together the two images represent the Cartesean edge image. The following then applies:

$$x\text{Img} = \text{inImg} * Kx$$

$$y\text{Img} = \text{inImg} * Ky$$

The Cartesean edge images are converted to the polar format at 16 which is formed of a magnitude and a direction image. There are four preferred methods for converting to the polar image which are as follows:
Exact $$\text{Mag}(i,j) = \text{sqrt } (x\text{Img}(i,j)^2 | y\text{Img}(i,j)$$

$$\text{Dir}(i,j) = \tan^{-1}(y\text{Img}(i,j)/x\text{Img}(i,j))$$

Quantize4.

$$\text{Mag}(i,j) = \text{sqrt}(x\text{Imag}(i,j))^2 + (y\text{Img}(i,j))$$

$$\text{Dir}(i,j) = 0 \text{ if } \text{abs}(x\text{Img}(i,j)) \geq \text{abs}(y\text{Img}(i,j)) \text{ and } x\text{Img}(i,j) \geq 0$$

$$\text{Dir}(i,j) = 180 \text{ if } \text{abs}(x\text{Img}(i,j) \geq \text{abs}(y\text{Img}(i,j) \text{ and } x\text{Img}(i,j) < 0$$

$$\text{Dir}(i,j) = 90 \text{ if } \text{abs}(x\text{Img}(i,j)) < \text{abs}(y\text{Img}(i,j) \text{ and } y\text{Img}(i,j) \geq 0$$

$$\text{Dir}(i,j) = 270 \text{ if } \text{abs}(x\text{Img}(i,j) < \text{abs}(y\text{Img}(i,j) \text{ and } y\text{Img}(i,j) < 0$$

Quantize8

$$\text{Mag}(i,j) = \text{sqrt}(x\text{Img}(i,j)^2 + y\text{Img}(i,j)^2)$$

$$\text{TempDir}(i,j) = \tan^{-1}(y\text{Img}(i,j)/x\text{Img}(i,j)$$

$$\text{Dir}(i,j) = 0 \text{ if } (\text{TempDir} \geq -22.5) \text{ and } (\text{TempDir} < 22.5)$$

$$\text{Dir}(i,j) = 45 \text{ if } (\text{TempDir} \geq 22.5) \text{ and } \text{TempDir} < 67.5)$$

$$\text{Dir}(i,j) = 90 \text{ if } (\text{TempDir} \geq 67.5) \text{ and } \text{TempDir} < 112.5)$$

$$\text{Dir}(i,j) = 135 \text{ if } (\text{TemDir} \geq 112.5) \text{ and } (\text{TempDir} < 157.5)$$

$$\text{Dir}(i,j) = 180 \text{ if } (\text{TempDir} \geq 157.5) \text{ and } (\text{TempDir} < 202.5)$$

$$\text{Dir}(i,j) = 225 \text{ if } (\text{TempDir} \geq 202.5) \text{ and } (\text{TempDir} < 247.5)$$

$$\text{Dir}(i,j) = 270 \text{ if } (\text{TempDir} \geq 247.5) \text{ and } (\text{TempDir} < 292.5)$$

$$\text{Dir}(i,j) = 315 \text{ if } (\text{TempDir} \geq 292.5 \text{ and } (\text{TempDir} < 337.5)$$

Quantize 16

Similar to Quantize8, with the direction quantized to 16 values (0, 22.5, 45, . . . ) The magnitude and the direction images are then thresholded according to the constraints set for the strength and direction of edge pixels at 18.

Edge pixels that are separated by a distance not greater than the link gap, are grouped to form edge support regions. The link gap defines the size of the neighborhood for each pixel. For example, a gap of 1 yields a pixel neighborhood size of 3×3. In the preferred embodiment the gap is equal to 1. If the gap is less than 1, then it is known at 20 that the edge pixel cannot be linked into edge regions and it fails as shown at 22.

Link parameters 26 are used to link edge pixels into edge support regions at 24 from which line edge segments are constructed at 28. An edge pixel in an edge support region adds one of its neighbors to the edge region if the difference in their magnitude and the difference in their directions are within a strength and a direction tolerance respectively and if the max-min direction deviation in this region does not exceed a maximum value. Typical values of the link parameters to extract line edge segments are a strength tolerance of 255 gray levels, a direction tolerance of 10 degrees and a maximum direction deviation of 30 degrees.

Line edge segments are constructed from edge support regions using a method similar to that described in J. B. Burns, A. R. Hanson, E. M. Riseman, "Extracting Straight Lines", IEEE Pattern Analysis and Machine Intelligence, Volume PAMI-8, #4, July 1986 which is incorporated herein by reference. As described by Burns, et al., each support region can be viewed as a planar surface with plane parameters being obtained by a weighted least squares fitting to the intensity pixels of the support region. The weighting function is the edge magnitude. The intersection of this plane with another horizontal plane representing the average intensity weighted by the magnitude results in the line edge segments.

It is understood that finding line edge segments is well known in the art and the above described methods only reference the preferred techniques used in the context of the present invention.

Once the line edge segments are found in input image 10 corners are located within the image as shown at 56 in FIG. 6. The located corners within the image may be coined extracted feature from input image 10. A corner may be defined as including, but not limited the following features as illustrated in FIGS. 5A, 5B and 5C. A corner may include a location 36 which is defined with an X and Y coordinate position within input image 10. A corner may also include a direction 40 defined by an angle φ shown at 38. A corner may also be defined by polarity meaning whether it is a bright corner or a dark corner, examples of which are shown in FIG. 5C. As shown in FIG. 5A the corner is made up of line edge segments 34'. The algorithm for finding a corner is based on building corners from extracted line edge segments 34' Each pair of line edge segments 34' are checked to see if together they form two sides of a corner. The angle between two line segments 34' is calculated and checked for whether it lies within a predefined min-max corner angle range.

In extracting corners several parameters are used. These are based on the polygon model and are typically user defined. The parameters include minimum corner angle which is the minimum angle in the polygon model from which a tolerance value of twenty degrees is subtracted. A maximum corner angle parameter is included which is the maximum angle from the polygon model with an added tolerance of twenty degrees. An allowable missing portion of the corner side parameter is set to be half the largest side length of the polygon. A corner polarity is set which is the same as the polygon polarity. These parameters allow the system to find corners within input image 10 which are good candidate for matching.

When extracting corners from input image 10 angle ◯ shown at 42 is calculated and checked for whether it lies within the predefined minimum/maximum corner angle parameter. The point of intersection of the two line segments determines the corner location. For each of the two line segments under investigation, the distance between the corner location and the line segment end point closest to it, is calculated. This represents the missing part of a side of the corner and is checked to make sure it is less than a predefined allowable distance. A quality score is calculated for each extracted corner and is inversely proportional to the length of the missing portion of the corner, i.e. as the missing portion increases the corner score decreases. As shown in FIG. 5B each line edge segment 34' includes a direction 44 based on its polarity (i.e. wether the line edge has a light to dark, or a dark to light transition). As seen in FIG. 5A the directions 44 of the line 34' indicate a corner may be possible. But, as shown in FIG. 5B the direction 44 or polarity of lines 34' indicates that a corner is not possible.

With reference again to FIG. 6 after corners have been extracted from input image 10 a geometric match process is used at 60 to compare the extracted corner features against the corner features from polygon model 64 to determine whether one or more matches exist. The system may provide a match score which is the sum of the scores of the matched data features divided by the number of features from the model. The match score can be compared against a match threshold which is a threshold or limit for the overall match score. The match score may be expressed as a percentage.

The geometric match of the first aspect of the present invention may be of any type. Available types include search trees; key feature algorithms; generalized HOUGH algorithms and geometric hashing. A search tree generally describes the concept of individually comparing extracted features from an input image against component subparts of the model features, or in this case the polygon model. All combinations of features extracted from the input image are searched through all of the model features to determine a match. For example, the polygon model may have five model features and these five model features would be searched across all combinations of the extracted features to find a match. It is understood that any type of geometric matching may be used in the first aspect of the present invention. However, the best mode of practicing the polygon finder of the first aspect of the present invention involves using a pruned tree search technique which is the subject of the second aspect of the present invention which will be described in greater detail below.

In the best mode of the present invention, after the geometric matching at 60 pose attributes and fit errors are calculated for all matches at 68. A pose describes the attributes of the match between polygon model 64 and the features extracted from input image 10. These attributes include shifts in X and Y direction, changes in scale in both the X and Y direction, and the amount the match is rotated. A feature count score and a match score may also be calculated. The feature count score is calculated as the sum of the matched individual data features divided by the total number of model features, for example 8 of 10. The match score is calculated as the sum of the scores of the matched features divided by the total number of model features. The score has a percentage range between 0 and 100. A fit error may be calculated which is a quality measure for how well the matched data fit to the model oriented according to the calculated pose. As shown in FIG. 6 the matches are sorted at 70 and the systems inquires as to whether matches are found at 72. If polygons are found it is so indicated at 76 and if they are not found it is so indicated at 74.

The second aspect of the present invention relates to an improved search tree for geometric matching technique. The improvement involves pruning or truncating the search tree branches when pose attributes calculated from at least three model features fall outside defined boundaries or when the fit errors become larger than the maximum values calculated from feature uncertainty error bounds. In the best mode of the first aspect of the present invention, the pruned tree geometric matching technique of the second aspect of the present invention is used to at 60 as shown in FIG. 6. It is understood that the improved pruned tree search with geometric matching technique according to the second aspect of the present invention may be used to locate any type of geometric model and is not limited to polygons. For example, such models may include circles, ovals, randomly spaced geometries or general patterns.

Figure 8A:
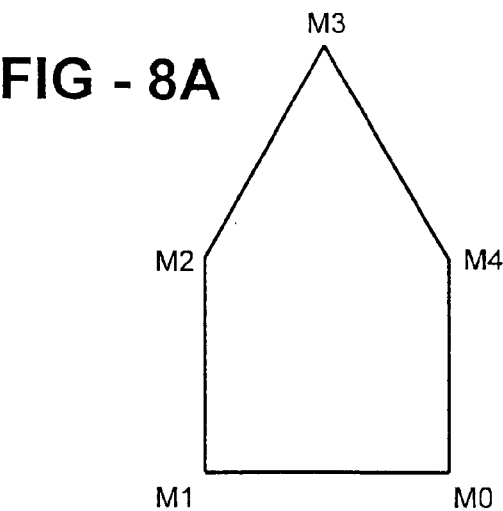
FIG. 8A illustrates a generic polygon model with model feature identical as, M0, M2, M3 and M4.

While not intended to be limiting, the second aspect of the present invention will be generally described in the context of finding polygons. The pruned tree search according to the second aspect of the invention is illustrated in FIGS. 7 through 11. FIG. 7 generally illustrates the concept of search trees with model features indicated on the left and extracted data features indicated through the branches of the tree. The term model feature denotes a feature taken from the geometric model which was trained earlier in the process. If the geometric model is a polygon, as shown in FIG. 8A, each corner M0, M1, M2 . . . , may be a model feature. The model feature parameters could be direction (indicated by an angle ⊖) X location, Y location, or polarity.

The extracted features could be corner features from the input image 10 as described above, and as illustrated in FIG. 8B. The extracted features are illustrated as D0, D1, D2 . . . As illustrated in FIG. 7 a data of "−1" indicates the possibility that the feature may be missing in the match.

Constructing and searching a tree is as indicated in the prior art as an exponential process. That is, all model features (M0, M1, . . . ) must be compared against all combinations of datum (e.g. D0, D1, D2 . . . ). The present invention provides a method to prune the search tree, or cut the branches short before all combinations have been explored to speed up the process. In its preferred embodiment feature uncertainty error bounds are used to calculate maximum allowable fit errors and the latter, together with min/max bounds on the pose attributes, are used to eliminate branches on the search tree. The feature uncertainty errors include X and Y location errors defined as $\Delta x$ and $\Delta y$. These are allowable fit errors for each matched data feature from the pose-transformed model feature after match. A direction uncertainty error $\Delta d$ is also provided and sets a tolerance value for the direction attribute of the features. The pose attributes are the same as those described above in connection with the first aspect of the present invention, i.e. shifts in direction, scale changes, and rotation angle variations.

Figure 9:
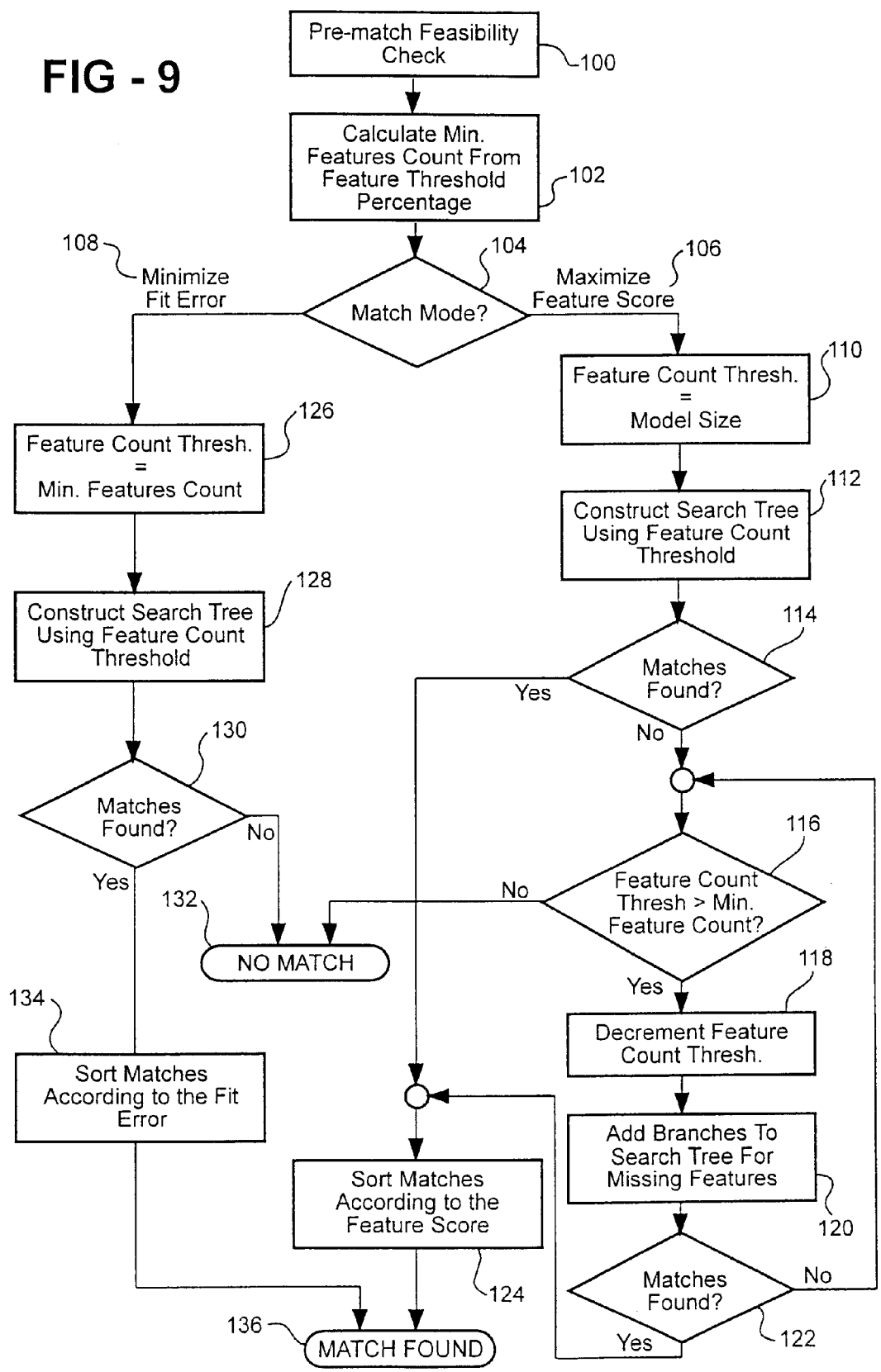
FIG. 9 is a flow chart illustrating the general pruned tree search including options minimizing fit error and maximizing feature score.

Generally speaking and with reference to FIG. 9, the overall matching algorithm is outlined. Before matching, each pair of model and data features is checked to determine whether they are locally consistent and thus feasible to match them together. For example whether M0 matches D6. This occurs at 100. Local consistency measures that provide the feasibility criterion may include feature type (e.g. corner, point, ray, or . . . ), polarity, and uncertainty error, rotation and scale pose bounds. The direction uncertainty error is a tolerance value that may be dependent on the features detector. Item 100 eliminates branches of the search tree early on before the matching process starts.

The match process starts with the calculation of the number of features that must be matched. This is the minimum feature count calculated at 102 from the feature threshold percentage set by the user. The user is prompted for match mode at 104. Two match modes are available. The first, 108, minimizes fit error while the second, 106, maximizes feature score.

If the match mode is to minimize the fit error, then the search tree is constructed using a defined minimum number of features, e.g. 3 of 5, 5 of 7. Branches corresponding to missing features are added only if they give rise to leaves (i.e. follow on branches) that have a number of feature matches greater than or equal to the minimum number required. Construction of the search tree then uses a depth-first technique. Levels of the tree correspond to model features. Starting with model feature M0, for example which is shown in FIG. 8A, the search loops through the data features (D0 through D11 shown in FIG. 8B) until it finds a model feature that is feasible to match with the model feature. A branch is added for this match, and looking for a match for the next model feature is attempted. (i.e. moving down to the next level of the tree). Branches added in the next level are referred to as children branches of the previous level branch. The process continues to look for data features that matches the current tree level model feature and moves down the tree if one is found. If no matches are found for this level or the last tree level has been reached, the system traverses back to the parent branch in the above level and attempts to add more branches corresponding to other data matches. The process ends upon returning to the root level and no more matches can be added.

As shown in FIG. 9, and operating within a minimized fit error indicated at branch 108. As shown at 126 the feature count threshold is set to be the minimum feature count. In this example it will be assumed that the minimum feature count is three of five features. A search tree is then constructed at 128 using the feature count threshold, in this example, three of five. The tree is completed for each possibility that includes instances in which any three extracted features, or more, out of five possible matches are found. Thus the search tree must rotate through each permutation in which model features are assumed to be missing from the extracted data features. As discussed in greater detail below, the search tree is pruned, so that each branch is not necessarily expanded to its end conclusion. The system then queries as to whether the number of matches requested by the user are found at 130. Once all the matches have been found they are sorted at 134 according to the fit error. The system reports a list of all the matches at 136 with the lowest fit error match at the top of the list.

If the user selects to maximize the number of feature matches at 106, the construction of the tree starts with a high feature number threshold (i.e. all of the features would be required to match against the model). Thus no missing data branches are added during tree construction. Adding branches will proceed as described below. If the required number of matches is not found, the feature count threshold is decrement by one and an attempt would be made to add branches to the search tree that correspond to missing features and their children branches. The process ends when matches are found or when the feature count threshold is below the feature score threshold. During the tree construction, if the required number of matches is found and the matches each have a feature score that is greater than or equal to an early out threshold, tree construction may be terminated. Matches would then be sorted in a descending order of the features score. Matches which have equal scores are sorted in ascending order of their fit errors.

For illustrative purposes and again with reference to FIG. 9 it will be assumed that the user chooses to maximize score at 106. If the user desires to maximize feature score the feature count threshold equals the model size as referenced at 110. This for example would be five of five. Thus, the search tree would be looking for matches where five features match as in 112. As shown at 114, if the number of matches required by the user is found, the matches are sorted according to feature score at 124 and the system reports a success at 136. This may be viewed as an early out. If the user does not desire an early out, an early out threshold may be set to exceed, for example, five of five matches.

If not all the matches were found where five data features matched all five model features, then the system would look at matches which had missing features. The system checks if the required number of features is higher than the min feature threshold defined by the user at 116. If it is higher, the feature count threshold is decrement by one at 118 to match, for example, four out of the five model features. Branches could be added for the missing features to find matches. Thus, if the matches are four of five or three of five, those matches could be found by adding new branches at the tree at 120 and then also added to the collection of matches at 124 which may be subsequently sorted by feature score. The system reports a list of all the matches found with the one having the maximum number of features at the top of the list.

The feature score is the percentage of model features which have been matched. A match score may also be provided. As stated above, the match score is calculated as the sum of the matched individual data scores divided by the model size.

Figure 8B:
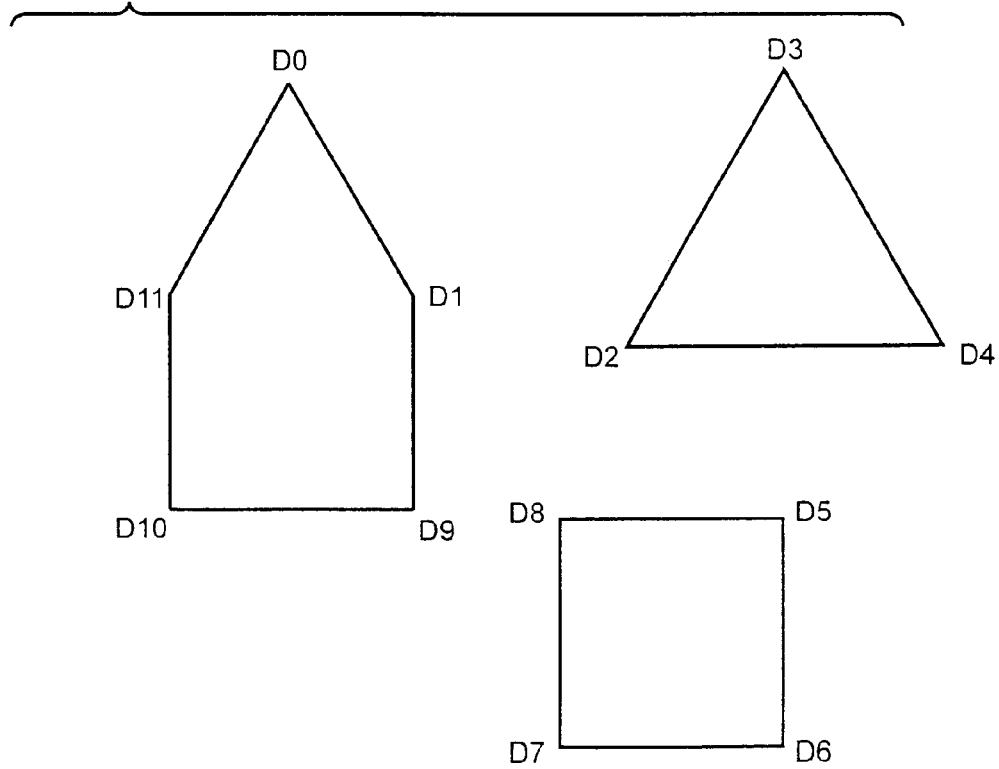
FIG. 8B illustrating 12 extracted data features from an input image with the data further identified as D0, D1, D2 . . . .
Figure 10A:
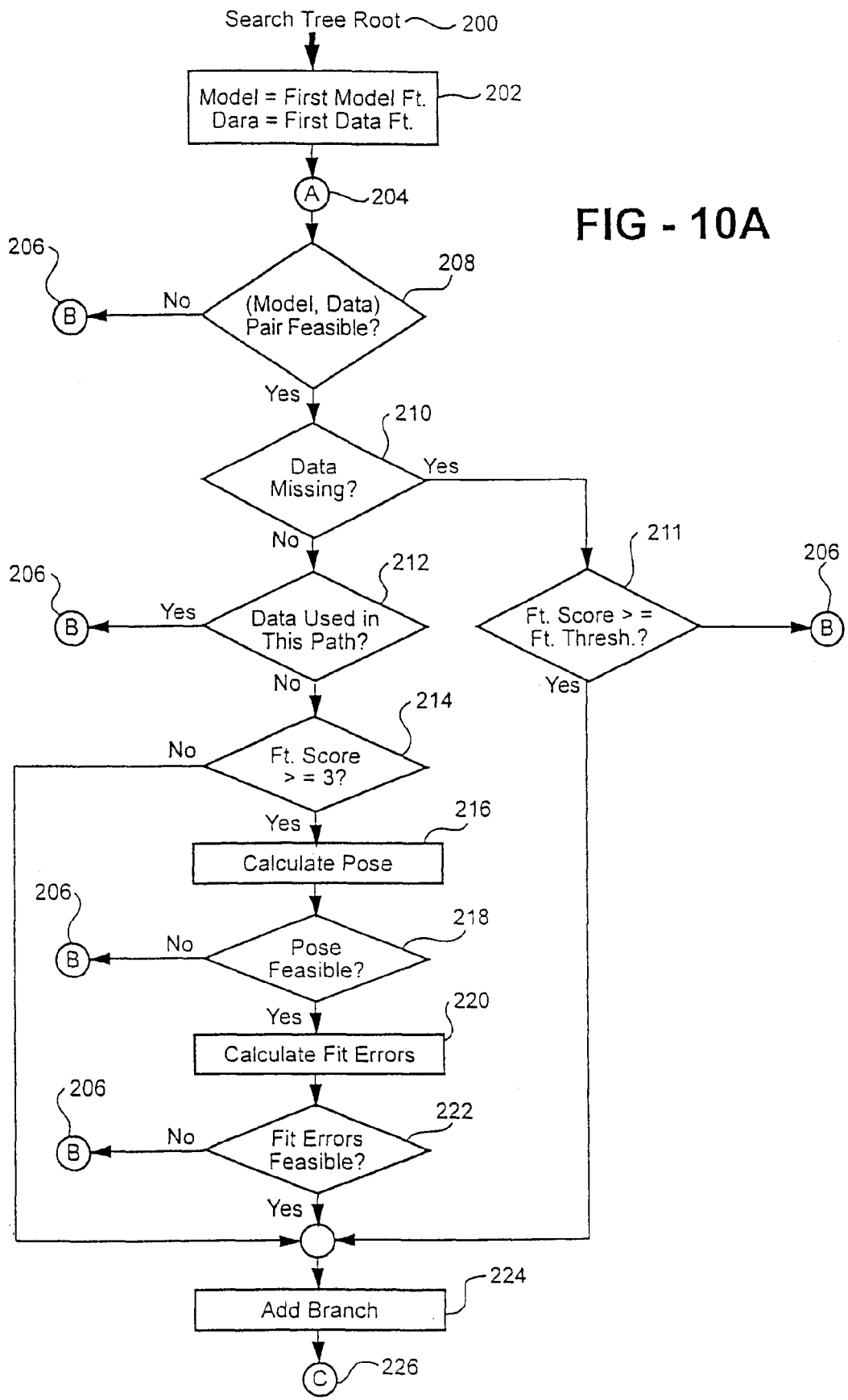
FIG. 10A is a flow chart illustrating the manner in which the pruned tree search operates.

FIGS. 10A, 10B and 10C illustrate the pruned search tree construction process which is used at 128 and/or 112 as referenced in FIG. 9. With reference to FIG. 10A the pruned search tree begins with the search tree root at 200 where the first model is defined as the first model feature and the first data is defined as the first data feature. Representative model and data features are shown in FIGS. 8A and 8B, respectively. Construction of the first branch is indicated at 208, where a model feature is compared against a data feature extracted from input image 10. If the pair is not locally consistent it is considered a non-feasible match and the process moves to B, referenced as 206. With reference to FIG. 10B, the search then inquires whether there are any more data features at 250. If there are more data features the next data feature is set as the current data feature as in 252 and the search goes back to reference A at 204. This can be thought of as traveling to the next horizontal level or next data feature as referenced in FIG. 7.

If it is the end of data features at 250 it is determined whether the search is back to the tree root at 254. If the search is back to the tree root then the process ends at 256. If not, the search moves up one tree level to a parent branch, noted at 258 and more data features are examined by moving back to 206. This loop is then continued until there is either a match or the tree root has been reached. If the search moves back to 204 (Reference A) and the next data feature matches the model at 208 an inquiry is made as to whether data is missing at 210. If data is missing the search moves to 211 to determine if the feature score is greater than or equal to the feature threshold. The feature threshold is the threshold for the percentage of model features that must be matched. If the feature score is greater than or equal to the feature threshold a branch is added at 224. Adding a branch as indicated at 224, and with reference to FIG. 8, indicates moving downward.

After a branch is added at 224, the search then moves to transition point C indicated at 226. The operation after 226 is shown in FIG. 10C. After the next branch has been added, an inquiry is made whether the last tree level has been reached at 228. If it is not at the last tree level at 228 it moves to 206 the operation of which is shown in FIG. 10B and is described above. If the search is at the last tree level, i.e. the last model feature, at 228 then the match score is calculated at 230. The match score is compared against the match threshold at 232. If the match score is greater than or equal to the match threshold the match is added to other matches at 234. The pruned search inquires as to whether the decision has been made to maximize the number of features at 236 and if so the feature score is compared to the early-out threshold at 238. If the feature score is greater than or equal to the early out threshold, the system checks if all the required number of matches have been found at 240. If all matches are found, the system exits at 242. If not, the system moves to 206. If the feature score is not greater than or equal to the early-out threshold the system moves to 206 referenced in FIG. 10B.

Returning to 232, if the match score is not greater than or equal to the match threshold the search returns to 206 as referenced in FIG. 10B. Similarly, and with reference to FIG. 10C if the answer to the inquires made at 236 or 238 is no, the search returns to 206 as referenced in FIG. 10B.

With reference item 210 in FIG. 10A if data is not missing it is determined whether the data is used in the path (the path being defined as the current search tree branch), i.e. whether the data feature would be duplicative if used again. If the data is used in the path the search returns to 206 as referenced in FIG. 10B. If the data is not used in the path it is determined whether the feature score is greater than or equal to three at 214. If the feature score is not greater than or equal to three additional branches are added at 224 and continues to 226 shown in FIG. 10C and as previously described. If the feature score is greater than or equal to three the pose is calculated at 216. If the pose is not feasible the search returns to 206 and calculates additional branches from the immediately preceding parent branch. This in effect truncates the branch if the pose for the first three data features is not feasible.

If the pose is feasible, fit errors are calculated at 220. If the fit errors are not feasible the search returns to 206 and looks at the immediately preceding level. Again this has the affect of truncating the branch if it is not feasible. If the fit errors are feasible additional branches are added. In this manner, after three or more features have been matched within a tree of data features the system can determine whether additional model and data features should be added by calculating the pose and determining whether the pose is feasible. If the pose indicates that the potential match is not probable the system can prune the tree and move up a branch level as indicated at b (206) and then examine other data features. Thus unnecessary comparisons between model features and data features are eliminated.

The pose is preferably calculated using a least squares minimization technique as shown by the following equations.

$$[dx \quad dy] = [mx \quad my \quad 1] \begin{bmatrix} Sx \cdot \cos\theta & Sy \cdot \sin\theta \\ -Sx \cdot \sin\theta & Sy \cdot \cos\theta \\ Tx & Ty \end{bmatrix}$$

Where, (dx, dy) is the data feature location, (mx, my) is the model feature location θ, is the rotation angle between the model and the data patterns, Sx is the scale in the x direction, Sy is the scale in the y direction, Tx is the shift in the x direction, andTy is the shift in the y direction. The above equation can be written in matrix form:

$$D = M.T$$

Where D is the data matrix, M is the model matrix and T is the Pose transformation matrix. The pose attributes can be calculated by solving for the transformation matrix:

$$T = (M^T M)^{-1} M^T D$$

There are two possible modes for the pose: affine and rigid. In the affine pose mode the scales Sx and Sy are calculated independently of one another. In the rigid mode an aspect ratio is imposed on the relation between Sy and Sx scales. The aspect ratio is a characteristic of the imaging device and can be entered manually or can be calculated using a device calibration process.

The calculated pose is compared to the setup pose bounds. If it is out of bounds, the branch is not added. If it is found to be within bounds the model features are transformed according to the calculated pose. Local and global fit errors are then calculated from the differences of the pose-transformed model and the corresponding data features locations. Local fit errors of a matched feature i are calculated from.

$$\delta x_i = |Sx.\cos(\theta).mx_i - Sx.\sin(\theta).my_i + Tx - dx_i|$$

$$\delta y_i = |Sx.\sin(\theta).mx_i - Sy.\cos(\theta).my_i + Ty - dy_i|$$

Global fit errors are calculated as the root mean square fit errors in the X and Y directions:

$$Ex = \left( \sum_{i=1}^{N} (\delta x_i)^2 \right)^{1/2}$$

$$Ey = \left( \sum_{i=1}^{N} (\delta y_i)^2 \right)^{1/2}$$

where N is the number of features matched.

The global fit errors are compared to the maximum allowable fit errors that are calculated from the user-defined location uncertainty errors and from the number of matched features:

$$Ex_{max} = \sqrt{\sqrt{N.\Delta_x^2}}$$

$$Ey_{max} = \sqrt{\sqrt{N.\Delta_y^2}}$$

If the global fit errors are less than the above-calculated maximum allowable values, and each feature's local fit error are less than the location uncertainty errors the branch is added.

Figure 11A:
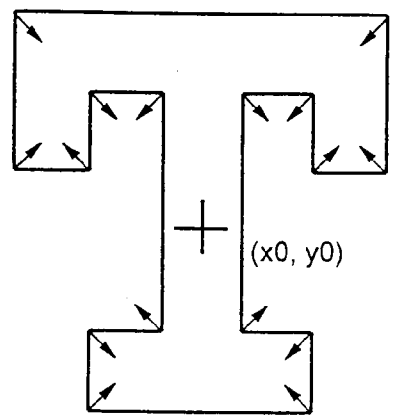
FIG. 11A illustrates a model representing a general pattern and matches to that pattern in an input image.
Figure 11A:
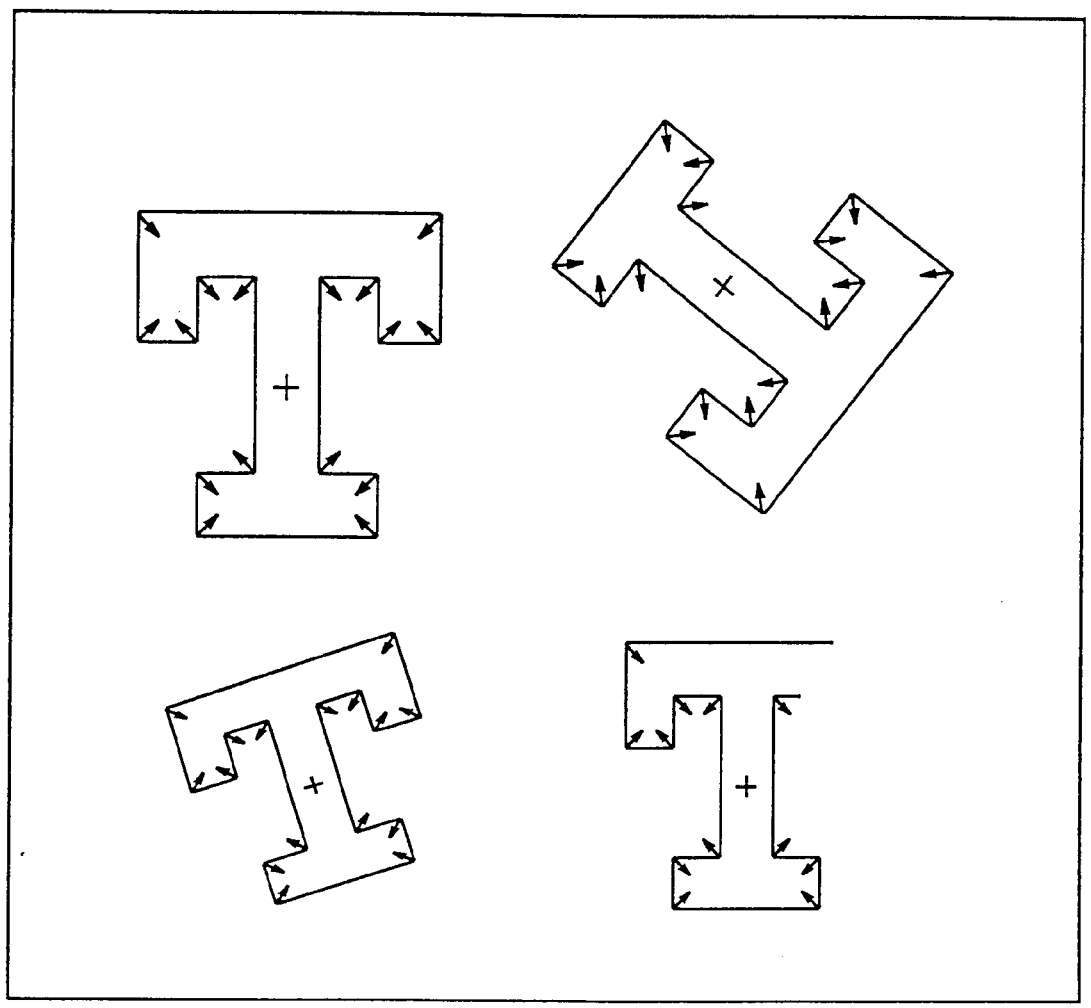
Figure 11B:
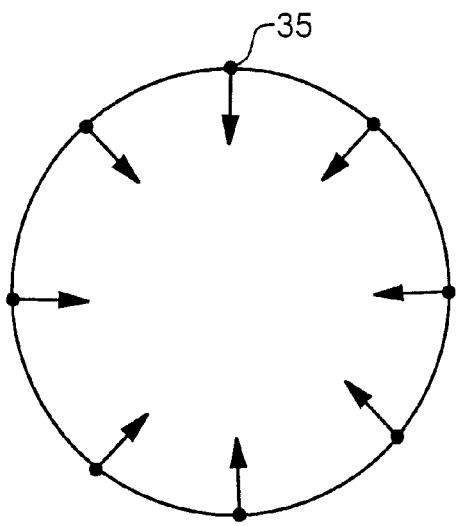
FIG. 11B illustrates a model representing a circle and matches to that circle in input images
Figure 11B:
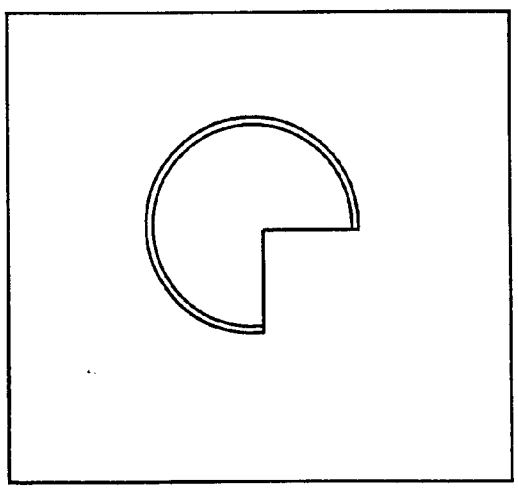
Figure 11B:
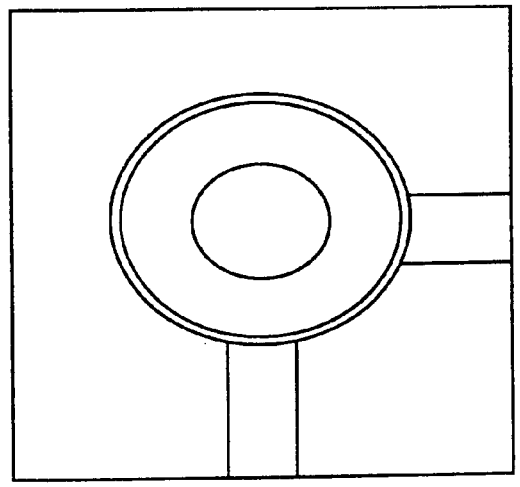

The pruned tree search of the second aspect of the present invention may be used to find any number of patterns beyond polygons including circles, ovals or collages of features. As illustrated in FIGS. 11A and 11B either a pattern or a circle can be trained and the corresponding pattern found.

As illustrated in FIG. 11A a pattern can consist of a collection of corners that need not have the same polarity. The corners can be specified explicitly by the user or can be automatically trained using a learn-by-show process.

As illustrated in FIG. 11B a model of a circle may consist of equally spaced directed edge points 35 that lie on the circle contour. In the preferred embodiment, eight points reliably find a circle in an input image.

It is understood that the best mode of practicing the first and second aspects of the present inventions are together thus finding polygons using the pruned tree search as above described.

The above described polygon finder and geometric matching technique are preferably executed by a computer program. The computer program is stored on a computer useable medium such as a CD rom, memory car, diskette or the like. The computer usable medium is loaded into the memory of processor 6 such that processor 6 instructs camera 5 to capture an image of chip 7. Processor 6 is then configured by the memory to carry out the polygon finder and/or geometric match as described above.

While the invention has been described in connection with what is presently considered to be the most practical and preferred embodiments, it is to be understood that the invention is not limited to the disclosed embodiments but, on the contrary, it is intended to cover various modifications and equivalent arrangements.

What is claimed is:

1. A method for performing a geometric match to locate an object within an image using a search tree comprising:
    providing a model of the object including a plurality of geometric model features;
    providing an input image;
    extracting a plurality of geometric features from the input image of the same quality of the geometric model features;
    comparing a first geometric model feature against the plurality of extracted geometric features and matching the first geometric model feature against a first extracted geometric feature if their comparison falls within predefined local consistency measures to thereby form a first branch within the search tree;
    comparing a second geometric model feature against the plurality of extracted geometric features and matching the second geometric model feature against a second extracted feature if their comparison falls within predefined local consistency measures to thereby form a second branch within the search tree which depends from the first branch;
    comparing a third geometric model feature against the plurality of extracted geometric features and finding a provisional match between the third geometric model feature and a third extracted geometric feature;
    calculating a pose based on the comparison of the first through third model features and extracted features, and not accepting the provisional match if the pose falls outside a predefined pose bound.

2. A method as in claim 1 comprising:
    transforming the model features based on the calculated pose, and
    calculating fit errors based on the difference between the pose-transformed model and the matched features location, and
    not accepting the provisional match if the fit errors fall outside the maximum defined fit errors.

3. A method as in claim 2 where the geometric match is set to minimize fit error by constructing the search tree with a minimum number of matched features wherein the minimum number of matched features is less than the plurality of geometric features.

4. A method as in claim 2 wherein the fit errors calculated are local fit errors for each individual pose-transformed model feature and matched feature pair; and
    global fit errors are calculated as the root mean square error for the difference in locations of the pose-transformed model features and the corresponding extracted features.

5. A method as in claim 2 where the match is set to maximize the number of matched features by constructing the search tree such that a required number of matches is that all of the geometric features are matched against extracted geometric features.

6. A method as in claim 5 where the number of the number of matched features is decremented by one if the required number of matches cannot be found within the extracted features.

7. A method as in claim 5 where the matches are sorted and a success is reported.

8. A method as in claim 2 wherein the fit errors calculated are local fit errors for each individual pose-transformed model feature and matched feature pair; and
    global fit errors are calculated as the root mean square error for the difference in locations of the pose-transformed model features and the corresponding extracted features.

9. A method for performing a geometric match to locate an object within an image using a search tree comprising:
    providing a model of the object including a plurality of geometric model features;
    providing an input image;
    extracting a plurality of geometric features from the input image of the same quality of the geometric model features;
    comparing a first geometric model feature against the plurality of extracted geometric features and matching the first geometric model feature against a first extracted geometric feature if their comparison falls within predefined local consistency measures to thereby form a first branch within the search tree;
    comparing a second geometric model feature against the plurality of extracted geometric features and matching the second geometric model feature against a second extracted feature if their comparison falls within predefined local consistency measures to thereby form a second branch within the search tree which depends from the first branch;
    comparing a third geometric model feature against the plurality of extracted geometric features and finding a provisional match between the third geometric model feature and a third extracted geometric feature;
    calculating a pose based on the comparison of the first through third model features and extracted features, and not accepting the provisional match if the pose falls outside a predefined pose bound;
    transforming the model features based on the calculated pose, and
    calculating fit errors based on the difference between the pose-transformed model and the matched features location, wherein the fit errors calculated are local fit errors for each individual pose-transformed model feature and matched feature pair; and global fit errors are calculated as the root mean square error for the difference in locations of the pose-transformed model features and the corresponding extracted features and not accepting the provisional match if the fit errors fall outside the maximum defined fit errors wherein the maximum allowable local fit errors are the user defined feature location uncertainty bounds, and the maximum allowable global fit errors are calculated from the feature location uncertainty errors.

10. A method as in claim 1 further comprising:

comparing a fourth geometric model feature against the plurality of extracted geometric features and finding a provisional match between a fourth geometric model feature against a fourth extracted geometric feature if their comparison fall within predefined local consistency measures to thereby form a fourth branch of the search tree which depends from the third branch;

calculating a second pose, fit error and match score based on the comparison of the first through fourth features and not accepting the provisional match if any of them fall outside predefined bounds.

11. A method as in claim 10 wherein the fit errors calculated are local fit errors for each individual pose-transformed model feature and matched feature pair; and global fit errors are calculated as the root mean square error for the difference in locations of the pose-transformed model features and the corresponding extracted features.

12. A method as in claim 1 wherein the geometric model is characteristic of a circle having a contour and the geometric model features represent locations on the circle contour.

13. A method as in claim 1 wherein the model feature includes at least a characteristic location.

14. A method as in claim 1 wherein the pose is calculated using a least squares minimization technique.

15. A method of locating a polygon in an image comprising:

providing a polygon model including a plurality of model features, each model feature characteristic of a corner from the polygon;

providing an input image;

extracting a plurality of corner features from the input image;

comparing a first model feature against the plurality of extracted corner features and matching the first model feature against a first extracted corner feature if their comparison falls within predefined local consistency measures to thereby form a first branch within a search tree;

comparing a second model feature against the plurality of extracted corner features and matching the second model feature against a second extracted corner feature if their comparison falls within predefined local consistency measures to thereby form a second branch within the search tree which depends from the first branch;

comparing a third geometric model feature against the plurality of extracted corner features and finding a provisional match between the third geometric model feature and a third extracted corner feature;

calculating a pose, fit error and match score based on the comparison of the first through third model features and extracted corner features, and not accepting the provisional match if the any of them fall outside predefined bounds.

16. A method as in claim 15 wherein the corner features include a location, polarity and direction.

17. A method as in claim 16 wherein the pose includes shifts in direction, scale changes and angles of rotation.

18. A method as in claim 17 wherein the scale changes are calculated in a X and a Y direction.

19. A method as in claim 18 wherein the scale changes in the X and Y directions are calculated independently of one another.

20. A method as in claim 18 wherein an aspect ratio is imposed on changes in scale in the X and Y direction.

21. A computer readable storage medium containing software executable by a computer to perform process steps for performing a geometric match to locate an object within a captured image utilizing a model of the object, wherein the model includes a plurality geometric features, the process steps comprising:

extracting a plurality of geometric features from the input image of the same quality of the geometric model features;

comparing a first geometric model feature against the plurality of extracted geometric features and matching the first geometric model feature against a first extracted geometric feature if their comparison falls within predefined local consistency measures to thereby form a first branch within the search tree;

comparing a second geometric model feature against the plurality of extracted geometric features and matching the second geometric model feature against a second extracted feature if their comparison falls within predefined local consistency measures to thereby form a second branch within the search tree which depends from the first branch;

comparing a third geometric model feature against the plurality of extracted geometric features and finding a provisional match between the third geometric model feature and a third extracted geometric feature;

calculating a pose based on the comparison of the first through third model features and extracted features, and not accepting the provisional match if the pose falls outside a predefined pose bound.

22. A computer readable storage medium as in claim 21 wherein the process steps further comprise:

transforming the model features based on the calculated pose, and calculating fit errors based on the difference between the pose-transformed model and the matched features location, and not accepting the provisional match if the fit errors fall outside the maximum defined fit errors.

23. A computer readable storage medium as in claim 22 where the geometric match is set to minimize fit error by constructing the search tree with a minimum number of matched features wherein the minimum number of matched features is less than the plurality of geometric features.

24. A computer readable storage medium as in claim 23 where the search tree rotates through multiple permutations in which model features are assumed to be missing from the extracted geometric features.

25. A computer readable storage medium as in claim 22 where the match is set to maximize the number of matched features by constructing the search tree such that a required number of matches is that all of the geometric features are matched against extracted geometric features.

26. A computer readable storage medium as in claim 25 where the number of the number of matched features is decremented by one if the required number of matches is cannot be found within the extracted features.

27. A computer readable storage medium as in claim 25 where the matches are sorted and a success is reported.

28. A computer readable storage medium as in claim 22 wherein the fit errors calculated are local fit errors for each individual pose-transformed model feature and matched feature pair; and global fit errors are calculated as the root mean square error for the difference in locations of the pose-transformed model features and the corresponding extracted features.

29. A computer readable storage medium containing software executable by a computer to perform process steps for performing a geometric match to locate an object within a captured image utilizing a model of the object, wherein the model includes a plurality of geometric features, the process steps comprising:

extracting a plurality of geometric features from the input image of the same quality of the geometric model features;

comparing a first geometric model feature against the plurality of extracted geometric features and matching the first geometric model feature against a first extracted geometric feature if their comparison falls within predefined local consistency measures to thereby form a first branch within the search tree;

comparing a second geometric model feature against the plurality of extracted geometric features and matching the second geometric model feature against a second extracted feature if their comparison falls within predefined local consistency measures to thereby form a second branch within the search tree which depends from the first branch;

comparing a third geometric model feature against the plurality of extracted geometric features and finding a provisional match between the third geometric model feature and a third extracted geometric feature;

calculating a pose based on the comparison of the first through third model features and extracted features, and not accepting the provisional match if the pose falls outside a predefined pose bound;

transforming the model features based on the calculated pose, and calculating fit errors based on the difference between the pose-transformed model and the matched features location, and wherein the fit errors calculated are local fit errors for each individual pose-transformed model feature and matched feature pair; and global fit errors are calculated as the root mean square error for the difference in locations of the pose-transformed model features and the corresponding extracted features and not accepting the provisional match if the fit errors fall outside the maximum defined fit errors wherein the maximum allowable local fit errors are the user defined feature location uncertainty bounds, and the maximum allowable global fit errors are calculated from the feature location uncertainty errors.

30. A computer readable storage medium as in claim 21 wherein the process steps further comprise:

comparing a fourth geometric model feature against the plurality of extracted geometric features and finding a provisional match between a fourth geometric model feature against a fourth extracted geometric feature if their comparison fall within predefined local consistency measures to thereby form a fourth branch of the search tree which depends from the third branch;

calculating a second pose, fit error and match score based on the comparison of the first through fourth features and not accepting the provisional match if any of them fall outside predefined bounds.

31. A computer readable storage medium as in claim 30 wherein the fit errors calculated are local fit errors for each individual pose-transformed model feature and matched feature pair; and global fit errors are calculated as the root mean square error for the difference in locations of the pose-transformed model features and the corresponding extracted features.

32. A computer readable storage medium as in claim 21 wherein the geometric model is characteristic of a circle having a contour and the geometric model features represent locations on the circle contour.

33. A computer readable storage medium as 21 wherein the model feature includes at least a characteristic location.

34. A computer readable storage medium as in claim 21 wherein the pose is calculated using a least squares minimization technique.

35. A computer readable storage medium containing software executable by a computer to perform process steps far performing a geometric match to locate a polygon within a captured image utilizing a model of the polygon, wherein the model includes a plurality geometric features, the process step comprising:

providing a polygon model including a plurality of model features, each model feature characteristic of a corner from the polygon;

providing an input image;

extracting a plurality of corner features from the input image;

comparing a first model feature against the plurality of extracted corner features and matching the first model feature against a first extracted corner feature if their comparison falls within predefined local consistency measures to thereby form a first branch within a search tree;

comparing a second model feature against the plurality of extracted corner features and matching the second model feature against a second extracted corner feature if their comparison falls within predefined local consistency measures to thereby form a second branch within the search tree which depends from the first branch; comparing a third geometric model feature against the plurality of extracted corner features and finding a provisional match between the third geometric model feature and a third extracted corner feature; calculating a pose, fit error and match score based art the comparison of the first through third model features and extracted corner features, and not accepting the provisional match if any of them fall outside predefined bounds.

\* \* \* \* \*

UNITED STATES PATENT AND TRADEMARK OFFICE
CERTIFICATE OF CORRECTION

PATENT NO. : 6,735,343 B2  Page 1 of 1
APPLICATION NO. : 09/903265
DATED : May 11, 2004
INVENTOR(S) : Nevine Michael It is certified that error appears in the above-identified patent and that said Letters Patent is hereby corrected as shown below:

```
In the claims:
Actual claim 15 was left out and claim 19 was put in twice.

Column 20, line 29: "far" should read --for--
Column 7, line 36: "Mag(i,j)=sqrt (xImg(i,j)²+yImg(i,j)" should
     read --Mag(i,j)=sqrt (xImg(i,j+yImg (i,j)--
Column 7, line 42: "Mag(i,j)=sqrt(xImag(i,j))²+(yImg(i,j))"
     should read --Mag(i,j)=sqrt(xImg(i,j))²+(yImg(i,j))--
Column 9, line 7: "10 angle 0 shown" should read --10 angle
     θ shown--
Column 14, line 18: "T=(MᵀM)⁻¹MᵀD" should read --T=(Mᵀ.M)⁻¹.M
     ᵀ.D--
```

Column 14, line 55:

" $Ex_{max} = \sqrt{N.\Delta_x^2}$ " should read - - $Ex_{max} = \sqrt{N.\Delta_x^2}$ - -

" $Ex_{max} = \sqrt{N.\Delta_y^2}$ " should read - - $Ex_{max} = \sqrt{N.\Delta_y^2}$ - -

Signed and Sealed this

Eighth Day of August, 2006

JON W. DUDAS
*Director of the United States Patent and Trademark Office*